United States Patent [19]
Lane et al.

[11] Patent Number: 5,367,068
[45] Date of Patent: Nov. 22, 1994

[54] GLASS-LIKE POLYSACCHARIDE ABRASIVE GRIT

[75] Inventors: Christopher C. Lane, Laprairie; Ruben P. Lenz, Laval-sur-le-Lac; Costa Athanassoulias, Montreal, all of Canada

[73] Assignee: ADM Agri-Industries, Ltd., Montreal, Canada

[21] Appl. No.: 982,060

[22] Filed: Nov. 25, 1992

Related U.S. Application Data

[60] Continuation of Ser. No. 658,747, Feb. 21, 1991, abandoned, which is a division of Ser. No. 346,504, May 2, 1989, Pat. No. 5,066,335.

[51] Int. Cl.$^5$ .................. C07G 17/00; C07H 1/00; C07H 1/06; C08G 79/00
[52] U.S. Cl. .................. 536/124; 536/127; 536/120; 536/117; 536/106; 536/123.1; 527/310; 527/300; 426/661; 426/449; 134/7; 51/302
[58] Field of Search .............. 536/127, 120, 117, 183, 536/124; 527/310, 300, 308; 426/661, 449; 134/7; 51/302

[56] References Cited

U.S. PATENT DOCUMENTS

| | | | |
|---|---|---|---|
| 2,383,988 | 9/1945 | Perry | 51/293 |
| 2,426,072 | 8/1947 | Wall et al. | 51/282 |
| 2,622,047 | 12/1952 | Ayers | 134/7 |
| 4,048,123 | 9/1977 | Hramchenko et al. | 252/545 |
| 4,491,483 | 1/1985 | Dudacek et al. | 426/661 |
| 4,734,222 | 3/1988 | Winterton et al. | 252/546 |
| 4,769,253 | 8/1988 | Willard | 426/559 |
| 4,844,937 | 7/1989 | Wilkinson et al. | 426/449 |
| 4,965,081 | 10/1990 | Lazarus | 426/445 |

FOREIGN PATENT DOCUMENTS

| | | |
|---|---|---|
| 0164914 | 12/1985 | European Pat. Off. |
| 2922671 | 4/1980 | Germany |

OTHER PUBLICATIONS

Sair, Louis; Methods in Carbohydrate Chemistry, vol. IV, pp. 283–285.

*Primary Examiner*—Michael G. Wityshyn
*Assistant Examiner*—Louise N. Leary
*Attorney, Agent, or Firm*—Laff, Whitesel, Conte & Saret

[57] ABSTRACT

The present invention relates to a method for treating, and in particular for abrading surfaces, utilizing glass-like polysaccharide grits. The invention also extends to novel glass-like polysaccharide products, especially starches, and to processes for the production thereof. Additionally, there is disclosed cross-linked polysaccharide materials and glass-like starches having a substantially occluded water component. Combinations of these various polysaccharide grits and other abrasive grit materials are also disclosed.

33 Claims, No Drawings

GLASS-LIKE POLYSACCHARIDE ABRASIVE GRIT

This application is a continuation of application Ser. No. 07/658,747 filed Feb. 21, 1991, now abandoned, which is a division of Ser. No. 07/346,504 filed May 2, 1989, now U.S. Pat. No. 5,066,335 issued Nov. 19, 1991.

FIELD OF THE INVENTION

The present invention relates to glass-like polysaccharides and especially to the use thereof as abrasive grits.

BACKGROUND

Various glass-like polysaccharides are known in the art, including those disclosed in U.S. Pat. No. 3,706,598 and AU 74083/87. According to the Australian patent, such products have three basic applications, namely: snack foods, breakfast cereals and instant products. Such products are produced with a view to providing an intermediate that is readily puffed into a snack food or cereal, or in the production of foods such as instant pasta that can be rapidly hydrated on cooking (i.e. the structure is readily permeated by water during heating).

The U.S. patent relates to the production of glass-like starch hydrolysates having a dextrose equivalent of between 10 and 25, which are useful in dehydrated foods as bulking agents/humectants or as additives to soups or sauces, and which are readily dispersible in water.

In both cases the desired properties are related to the production of glass-like starches in which the internal structure of the product is sufficiently under-developed or disrupted as to allow water to be rapidly absorbed on the one hand, or rapidly released on the other.

Various abrasive grit materials are well known in a variety of arts, and have traditionally found application as sand blasting abrasives, most typically in applications such as cleaning building exteriors, or removing surface oxides from castings. Examples of other applications include those described in U.S. Pat. No. 3,485,671, which pertains to the scouring of the interiors of central air supply duct work and plenums. In such applications, the minor damage done to the surface being treated is not usually of any moment.

Applications exist, however, wherein it would be advantageous to utilize abrasive grits, but wherein the use of conventional grit materials is not acceptable because of consequential surface damage associated with their use. These include, for example, such applications as those disclosed in U.S. Pat. No. 4,659,391 which teaches using relatively soft grit materials entrained in a low velocity air stream in order to clean and remove flashing from the surfaces of molded sand cores, i.e. unfinished metallic castings having complex surfaces such as holes, projections, notches, and/or other irregularly shaped surfaces that are readily damaged by more traditional sand blasting media. Preferred particles are formed of polyethylene or polycarbonate cylinders having a length and a diameter in the size range of about 0.06 inches.

Another application involving sensitive substrates is described in U.S. Pat. No. 4,545,155. In this patent, abrasive grit material is used to remove flashing from molded electronic casings. In this application the generation of static electricity by the abrasive is also a problem. The patent teaches using a slurry comprised of a synthetic resin which is dispersed in water containing a surfactant. Examples of abrasive materials include thermosetting resins such as an epoxy resin, a urea resin, an unsaturated polyester resin, an alkyd resin, or relatively harder resins such as polystyrene, polycarbonate or acrylic. In this application a grit hardness equal to or close to that of the substrate is desired. These grits are preferred over those used previously in this application, such as alumina, silicon carbide, or glass beads, or even relatively softer abrasives such as walnut shell powder, because even the softest of these abrasives is much harder than the casings substrate, (typically epoxy resin), and therefore results in unacceptable surface damage.

U.S. Pat. Nos. 3,090,166 and 3,142,590 each describe the use of abrasives in various polishing applications where a superior surface finish is desired. An example of one especially sensitive application pertains to the commercial and military aircraft industries, wherein the paint on the aircraft's exterior must be removed periodically, without occasioning damage to the underlying surfaces or surface finishes.

The problem is made especially acute where the aircraft's skin is coated with an aluminum cladding. Aluminum cladding is generally not less than 4% of the coated sheets thickness for sheets that are less than 0.064 inches thick, and not more than 2% of the thickness of the sheet, for sheets that ar more than 0.064 inches thick. Damage to the coating can necessitate the removal of whole sections of the aircraft's skin for replacement.

Other surfaces of the aircraft may be of anodized or composite materials (i.e. fiberglass) which are also delicate.

Until relatively recently, therefore, the airline industries have stripped aircraft paint using methylene chloride based chemical paint removers. More stringent environmental legislation and health standards have made this approach both inconvenient and prohibitively expensive. A number of companies have actually had to postpone aircraft exterior surface maintenance programs rather than attempt to deal with the regulations and costs associated with chemical stripping.

A variety of alternative approaches using non-chemical, dry stripping of such paint surfaces have been attempted. These include the use of sugar, and other fine particulate matter. With regard to the use of sugar, experience has shown it to be too fine to be effective in its normal commercially available form. Solubilitization of commercially available crystalline sugar in water, followed by recrystallization to produce larger crystal structures does not improve its performance. Also sugar crystals are to brittle and hence are amenable to only a single use, which contributes greatly to its cost in this application.

A number of other organic materials have been employed as abrasive grits. U.S. Pat. No. 3,424,616, for example, describes the use of comminuted and pulverized vegetable material, preferably a cellulose material such as corncob grits, rice hulls. soybean hulls, and tapioca. U.S. Pat. No. 2,622.047 describes the use of lignocellulosic materials having densities of at least 1.2 and a size in the range of 12 to 40 mesh. Suitable materials are disclosed as including nut shells and seed stones such as shells of pecans, almonds, black walnut, English walnuts, and apricot, peach, or olive pits and the like. In general hulls from nut meats, although soft relative to more traditional grit materials, are still too hard for epoxy surfaces, according to U.S. Pat. No. 4,545,155. In addition, ground walnut shells disintegrate on contact with the surface of the aircraft, producing a fine dust and rendering the material substantially useless for any subsequent reuse in this application. Moreover, the dust represents an unacceptable explosion hazard and these materials are not used commercially for this reason. These problems are substantially the same as those which are dealt with in CA1094332, mentioned supra.

U.S. Pat. No. 2,426,072 discloses that it is known to use substances such as cracked wheat, clover seed, and other grains. This same patent, however, also teaches that such grits are, by and large unsatisfactory, and subject to numerous and significant disadvantages. For the reasons set out in this patent, synthetic resins are taught to have substantially superior qualities over the cereal grits. This is a view which still persists in the art today and engineering plastic materials continue to be used in commercial applications, most notably in aircraft paint stripping applications.

In spite of their advantages, the use of engineering plastic materials in grit applications still requires trained personnel, since the grits are sufficiently abrasive to result in permanent damage to aircraft skins, and require careful, skilled handling. Part replacement arising as a consequence of unacceptable amounts of surface abrasion are not uncommon. Notwithstanding the fact that engineering plastic grits are an improvement over more conventional materials with respect to the amount of dust generated in the course of their use, the use of these engineering plastic grits still requires dedication of facilities to dry-stripping operations, including the installation of large volume ventilation systems to avoid health and explosion problems created by the dust that is generated. In addition, removal of a portion, and rearrangement of the balance, of the aluminum-clad surface coating that results from the use of plastic grit can yield an unpolishable surface and can even result in increased surface area on the exterior surface and material stresses within the aircraft's skin.

Attempts at overcoming some of these shortcomings in the use of engineering plastic grit materials include those described in U.S. Pat. No. 4,731,125 which relates to the use of a special soft grit material at low operating pressures. Particles of plastic material such as urea formaldehyde or another thermoset resin are suggested. These particles have an apparent hardness of less than about 3.5 moh and are utilized in a fluid stream operating at about 40 psi.

In the cleaning of used PCB containers, such as barrels for example, the abrasive grits may serve to clean the interior of the containers.

There is a continuing need for inexpensive grit materials that are not heavily dependent on petroleum stock reserves and are preferably biodegradable.

SUMMARY

In accordance with one aspect of the present invention there is provided a method of treating a surface with glass-like polysaccharide particulates, such as glass-like starch grits, for example. Such glass-like polysaccharides are solid, annealed, glass-like materials which are normally transparent (or translucent), and which remain solid under standard ambient temperature and pressure conditions, and wherein moisture contained therein resides in the interstices of a matrix of the polysaccharide molecules.

"Annealed" herein refers to the formation of a molecular matrix structure through heating followed by cooling of the dispersed polysaccharide/water mixture which results in an integral and generally uniform glass-like material.

Treatments according to this aspect of the method of the present invention include case hardening, and abrasive applications. The present method includes applications such as, by way of example, projecting the particulates against a surface to be treated, including in particular a method of entraining the particulates in a fluid flow that is directed against such a surface. In addition to being independent of petroleum stocks, and being generally biodegradable, the glass-like polysaccharides also produce less static electricity in blasting applications.

In accordance with one aspect of the present invention therefore, there is provided a method comprising the step of treating a surface with particulates; for example, abrading a surface with abrasive particles wherein the particles comprise glass-like polysaccharide particulates. Other surface treatments include the use of particulates for case hardening a surface, such as the gel surfaces of plastics, especially fiberglass surfaces. The use of particulates in the present method can be accomplished by using these particulates, and especially grits, in conjunction with known devices, such as jet wheel blasters, which mechanically accelerate the particulates, and direct them against a surface to be treated. Jet blasters utilize a wheel whose circumference is operated at supersonic speeds. Other similar devices include centrifugal blasters which operate on a similar principle, but at generally lower speeds. In cases where the particulate is to be used as an abrasive, the grit may be secured to a substrate and the two are used together in much the same way as conventional sandpaper or other abrasive papers or cloths.

In one aspect of the method of the present invention, the glass-like polysaccharide grits are entrained in a fluid stream which is directed against the surface to be abraded. Such a surface may comprise a coating and an underlying substrate from which the coating is to be removed over the course of the treatment thereof by the action of the glass-like polysaccharide abrasive grit particles as they impinge on the coated surface under the impetus imparted by the fluid stream. Note that where such a surface comprises a coating and an underlying substrate from which the coating is to be abraded by the abrasive action of the glass-like polysaccharide grits, and wherein the coating is less hard than the substrate, it is preferred that the glass-like polysaccharide grits have an apparent hardness intermediate between the hardness of the coating and the hardness of the substrate.

In such applications of the method of the present invention, the glass-like polysaccharide abrasive grit particles are preferably entrained in a pneumatic stream that is produced by a compressor in known manner.

Glass-like polysaccharides useful in the present invention are exemplified by glass-like starches such as those disclosed in the previously mentioned U.S. Pat. No. 3,706,598 and AU 74083/877 patent documents.

Such products are solid, annealed, glass-like polysaccharide materials (which are normally transparent or translucent), and remain solid under standard ambient temperature and pressure conditions, and wherein moisture contained in the material is displaceably confined within the interstices of a matrix of polysaccharide molecules. For the present purposes such a material is preferably substantially uncrystallized and the matrix is generally amorphous.

While useful in the method of the present invention, such glass-like starches lack either or both of the hardness or particle integrity that is desirable in some surface treatment applications. Accordingly, glass-like polysaccharides having an even more developed internal structure are preferred, notwithstanding the fact that increasing the internal structure of such glass-like polysaccharides is diametrically opposed to the teachings of the two last above-mentioned patent documents, since the stated objectives and utility of each reference would be frustrated by any such increase in internal structure. One means for increasing the internal structure of glass-like polysaccharides useful in the method of the present invention is to chemically cross-link the polysaccharide molecules.

Accordingly, the invention also relates to the use of cross-linked glass-like polysaccharides, and further extends to such cross-linked polysaccharides per se, and to a process for the production of such cross-linked polysaccharides.

In one aspect then, the present invention relates to a cross-linked glass-like polysaccharide.

In another related aspect of the present invention there is provided a process for producing a chemically cross-linked, glass-like polysaccharide, comprising the steps of:
a) heating a homogeneous, aqueous mixture of dispersed polysaccharide molecules and a chemical cross-linking agent to anneal the mixture whereby at normal ambient temperatures the mixture forms a (normally transparent or translucent) glass-like solid;
b) reacting the chemical cross-linking agent with at least some of the polysaccharide molecules to produce intermolecular chemical cross-linkages between the polysaccharide molecules.

In general, increasing the degree of cross-linking within the glass-like polysaccharide increases the amount of internal structure within the grit material.

Another means which has been found to be especially useful in increasing the effective internal structure of glass-like polysaccharides useful in the method of the present invention, is to process the polysaccharide under conditions which otherwise tend to optimize the internal structure. By way of example, this can include processing in such a way as to avoid mechanical disruption of the polysaccharide matrix during the formation thereof, or of the molecules themselves by way of avoiding hydrolysis of the polysaccharide molecules. By the same token, the use of generally unhydrolysed polysaccharides as starting materials, such as starches having a relatively low dextrose equivalent, is generally preferred. Accordingly, there is also provided a solid, annealed, glass-like polysaccharide material which is normally transparent or translucent, and which remains solid under standard ambient temperature and pressure conditions, and wherein moisture contained in the material is substantially occluded within the interstices of a matrix of polysaccharide molecules. The substantial occlusion of the moisture results in these glass-like products being non-expandable using normal commercial methods associated with the production of, for example, the "expanded products" which are the subject of the above-mentioned AU 74083/87 patent document.

Furthermore, there is provided in accordance with the present invention, a process for the production of such glass-like polysaccharides having substantially occluded moisture contents, comprising the steps of heating a homogeneous, aqueous mixture of dispersed polysaccharide molecules sufficiently to anneal the mixture into a substantially uncrystallized, glass-like solid upon cooling thereof, and without substantial volatilization of the moisture following formation of a matrix of polysaccharide molecules therein, whereby the moisture contained in the mixture is substantially occluded within the matrix of polysaccharide molecules.

DETAILED DESCRIPTION

Sugars and polysaccharides are the two main classes of carbohydrates. As set forth in "Organic Chemistry" Vol. 1; I. Finar; Longmans, Green and Co.; 3rd edition, 1959, sugars include monosaccharides and oligosaccharides, with the latter in turn consisting of the disaccharides, trisaccharides and tetrasaccharides. Polysaccharides on the other hand are a chemically distinct class of carbohydrate polymers that contain at least five and usually a very great number of repeating saccharide units. The pentosans are an example of one class of polysaccharide and are based on repeating pentose units. More commonly, polysaccharides are based on larger repeating saccharide units in polymeric form, as in the case of starches, and celluloses both of which are based on repeating hexose units.

As has already been mentioned hereinabove, sugars are not commercially suited to use in the method of the present invention primarily because their crystalline structures readily fragment on impact and are not reusable once the grit size becomes too reduced as a consequence. By way of comparison to sugar, the glass-like polysaccharides useful in the method of the present invention have mechanical properties which result in greater grit integrity.

Preferably, the glass-like polysaccharide is based on an amylaceous polysaccharide, such as amylose of amylopectin or mixtures of the two. Accordingly, glass-like polysaccharides, herein, include those produced from starches such as corn, wheat, barley, rye, potato, or other starches. The preferred starch is wheat starch; prime or "A" grades are especially preferred. Both the selection of the starch and any modifications made thereto will affect the properties of the glass-like material. The length and branching of the polymer chains that are genetically predetermined and unique to any given unmodified starch, or which are the result of changes brought about in consequence of any modification of the starch, will have effects on the amount of, for example, hydrogen bonding and van der Waals forces (amongst others), which play a role in forming the above-mentioned glass-like polysaccharides. Thus, starches that have been hydrolytically modified form glass-like materials which are generally more brittle than are otherwise comparable glass-like materials based on unhydrolysed starch. Accordingly, while the method of the present invention extends to the use of glass-like polysaccharides produced from starch hydrolysates, it is preferred that the starches have a dextrose equivalent of 25 or less. More preferably, the starch has a dextrose equivalent of less than 10, and most preferred are starches which are substantially unhydrolysed, (i.e. having a dextrose equivalent of about 1 or less).

The moisture content of the glass-like polysaccharide affects apparent hardness and integrity of the material.

Preferably the moisture content of starch-based glass-like polysaccharides is between about 10% and 70%, more preferably less than 40%, and even more preferably in the range of from about 20% to 25%. In general, the more water that is present in the glass-like polysaccharide the greater the resiliency of the resulting material (with a lower apparent hardness), and the less aggressive grits based on such materials will be in, for example, removing a coating from a surface. On the other hand, the lower the moisture content the more generally brittle the material is likely to be, with a resultant loss of particle integrity and a greater rate of particle breakdown and hence higher grit costs to the user. Moreover, although moisture contents of less than about 10% are possible, the production of such products is likely to also result in thermal hydrolysis of the product, which is not generally desirable.

Starches in their native state have the form of granules of various sizes and shapes, and the amylaceous molecules that are bound in this granular structure must be dispersed in solution in the course of preparing glass-like starches. The process for carrying out this dispersion is well known in the starch industry as "gelatinization". In general, gelatinization entails heating an aqueous mixture of starch granules to a temperature at which the granules breakdown and the individual starch molecules disperse into solution. Typically, this is carried out in the course of producing the glass-like starch-based materials useful herein.

Materials useful herein are exemplified by those disclosed in previously mentioned U.S. Pat. No. 3,706,598 and AU 74083/87, both of which are hereby incorporated by reference. Other similar glass-like starches are also known, and are useful for the purposes of the method of the present invention. These can be prepared without undue experimentation and development, in accordance with known processes, existing skill in the art and having regard for the disclosure of the present specification.

As previously mentioned, the present invention relates to a process for producing a chemically cross-linked, glass-like polysaccharide, and in particular to a process for producing glass-like starch-based materials, comprising the steps of:
 a) heating a homogeneous, aqueous mixture of dispersed starch molecules and a chemical cross-linking agent to anneal the mixture whereby at normal ambient temperatures the mixture forms a (normally transparent of translucent) glass-like solid;
 b) reacting the chemical cross-linking agent with at least some of the starch molecules to produce intermolecular chemical cross-linkages between the starch molecules.

The increased structure attributable to cross-linking generally increases the apparent hardness of the glass-like material and improves the aggressiveness of abrasive grits produced therefrom. There are indications, however, that there may be a concomitant decrease in the integrity of such grit materials, particularly when the grit is prepared using an extrusion process. It is believed that this occurs as a consequence of an increase in the viscosity of the aqueous mixture, due to ongoing cross-linking. In the extrusion process, the glass-like polysaccharide generally can be processed faster and at slightly lower processing temperatures through the use of mechanical shear in an extruder. Notwithstanding the other benefits of extrusion processing, the effect of the shearing action on the cross-linking polysaccharide with its increasing viscosity, is to increase the shear rate and hence subdivide the molecular structures based on the interpolymeric physical bonding, and the polymer chains themselves, all of which results in a loss of particle integrity. The problem is exacerbated in the presence of a cross-linking catalyst, such as calcium carbonate for example.

The use of sodium hydroxide, or other source of hydroxyl ions in mixtures which do not contain cross-linking agents helps to reduce the viscosity of the aqueous mixture. In mixtures which contain cross-linking agents; however, the addition of hydroxyl agents initiates the cross-linking reaction, and actually leads to an increase in the viscosity of the mixture. Moreover the addition of caustic, while reducing the amount of breakdown of particles in use, also significantly reduces the aggressiveness of the particles.

It is contemplated that the problems associated with the extrusion of at least partially cross-linked, high viscosity, aqueous mixtures can be minimized by incorporating the cross-linking agent into the mixture without activating it. In this way the cross-linking reaction is postponed, preferably until the processing of the glass-like polysaccharide is otherwise substantially complete.

Higher moisture content also helps to prevent an excessively high viscosity, especially in the case of extrusion of the cross-linked glass-like polysaccharide, and starch-based products having about 25% moisture are preferred.

In accordance with another aspect of the present invention there is provided a process comprising the steps of:
 a) heating a homogeneous, aqueous mixture of dispersed polysaccharide molecules and a chemical cross-linking agent, to anneal the mixture whereby at normal ambient temperatures the mixture forms a glass-like solid;
 b) reacting the chemical cross-linking agent with at least some of the polysaccharide molecules to produce intermolecular chemical cross-linkages the polysaccharide molecules after the mixture has formed into the glass-like solid.

This can be accomplished, inter alia, by grinding the resulting solid and exposing the particulates that are so produced to a gaseous source of hydroxyl ions, which in turn initiate the cross-linking reaction. In this way, the surface, up to the depth to which the hydroxyl ions penetrate, undergoes cross-linking.

In accordance with another aspect of the present invention, there is provided a product comprising a solid, annealed, chemically cross-linked, glass-like polysaccharide, preferably starch-based and substantially uncrystallized, (normally transparent or translucent) and which remains solid under standard ambient temperature and pressure conditions. Accordingly, there is provided a glass-like polysaccharide including a minor effective amount of a chemical cross-linking agent such as for example a minor effective amount up to about 0.2%, typically between 0.01% and 0.2% and preferably between 0.033% to 0.066% of a cross-linking agent, such as epichlorhydrin, sodium tripolyphoshpate or sodium trimetaphosphate, for example, by weight of starch on a dry basis.

Examples 1, 2 and 3 herein below are illustrative of preferred starch-based glass-like materials of the present invention.

EXAMPLE 1

A cross-linked glass-like starch was prepared in accordance with this example, using a Werner & Pfleiderer C-37 twin screw extruder having a screw diameter of 37 mm and a processing barrel length of about 900 mm. The processing barrel was equipped with three temperature control zones, z1, z2, and z3 respectively. The first zone was a feed zone adapted to receive both dry and liquid feeds of the various raw materials used in this example. The second zone was a mixing zone incorporating two pairs of 30 degree right-handed kneading blocks in known manner. The third zone contained only conveying elements. A low intensity screw and a die plate having two 4 mm holes therein were used. The temperature of the product was maintained at below 110 degrees C. as it entered the die plate, but the die itself was neither heated nor cooled. A face cutter was used to cut the extrudate as it exited from the die plate, into pellets approximately 0.2 to 0.5 cm in length.

Starch (sold by Ogilvie Mills Limited under the trade mark Whetstar-4), water, 0.04% sodium hydroxide, 0.04% sodium trimetaphosphate and 0.04% calcium carbonate (all on a dry weight of starch basis), were fed to the extruder through the dry feed port and liquid feed port respectively at a total throughput of 8.6 kg/hr with a moisture content of 20%. The screw speed was maintained at 100 rpm and the temperature was controlled by heating each of the respective zones as follows:

z1(150 mm): 10–15 degrees C.
z2(450 mm): 50 degrees C.
z3(300 mm): 80 degrees C.

These extrusion conditions resulted in a glass-like starch product having a temperature of 103 degrees C. and a die pressure of 410 psi. A non-expanded, fully gelatinized product, having a light brown/yellow coloration, was produced within a matter of minutes which became hard and glass-like on standing under normal ambient conditions.

EXAMPLE 2

The following example describes a process for making a cross-linked glass-like polysaccharide utilizing a batch processing method. A slurry was prepared by dispersing 40% starch by weight in water, together with 0.04% epichlorhydrin and 0.04% sodium hydroxide (both based on the dry weight of starch), and then cooked until the starch was fully gelatinized. The resulting gel was poured to a depth of one half inch in a pan and dried for 2 hours in a forced air oven at 95 degrees C. After the first half hour of drying the product was removed from the oven and broken into small pieces, and then returned to complete the drying cycle. The resulting product was non-expanded, fully gelatinized and had a light brown-yellow coloration.

EXAMPLE 3

The process according to example 2 was repeated, with 0.04% sodium tripolyphosphate substituted for the epichlorhydrin used in the preceding example. The resulting product also was non-expanded, fully gelatinized, and had a light brown-yellow coloration.

The preceding three examples, in addition to being cross-linked, are also examples of solid, annealed, glass-like starch-based materials which are normally transparent or translucent, and which remain solid under standard ambient temperature and pressure conditions, and wherein moisture contained in the material is substantially occluded within the interstices of a matrix of starch molecules.

Examples of other such glass-like starch-based materials, which are not cross-linked are contained in Examples 4 through 8, below. For convenience, reference is made hereinafter to types of products in accordance with the following chart:

Type A product—starch, water and sodium hydroxide
Type B product—starch and water
Type C product—starch, water, sodium hydroxide, calcium carbonate and sodium trimetaphosphate.
Type I product—starch and water blend with silica gel

EXAMPLE 4

A preferred Type B, glass-like starch is prepared in accordance with this example, using a Werner & Pfleiderer C-37 twin screw extruder having a screw diameter of 37 mm and a processing barrel length of about 900 mm. The processing barrel was equipped with three temperature control zones, z1, z2, and z3 respectively. The first zone was a feed zone adapted to receive both dry and liquid feeds of the various raw materials used in this and the succeeding twin screw extruder examples. The second zone was a mixing zone incorporating two pairs of 30 degree right handed kneading blocks in known manner. The third zone contained only conveying elements. A low intensity screw and a die plate having two 4 mm holes therein were used. The temperature of the product was maintained at below 110 degrees C. as it entered the die plate, but the die itself was neither heated nor cooled. A face cutter was used to cut the extrudate as it exited from the die plate, into pellets approximately 0.2 to 0.5 cm in length.

Starch (sold by Ogilvie Mills Limited under the trade mark Whetstar-4) and water were fed to the extruder through the dry feed port and liquid feed port respectively at a total throughput of 8.6 kg/hr with a moisture content of 22%. The screw speed was maintained at 100 rpm and the temperature was controlled by heating each of the respective zones as follows:

z1(150 mm): 10–15 degrees C.
z2(450 mm): 50 degrees C.
z3(300 mm): 80 degrees C.

These extrusion conditions resulted in a glass-like starch product having a temperature of 103 degrees C. and a die pressure of 410 psi. A non-expanded, fully gelatinized product was produced within a matter of minutes which became hard and glass-like on standing under normal ambient conditions.

EXAMPLE 5

The following example illustrates the production of a Type A glass-like starch, using the same extruder that is described in the preceding example. The 20% moisture/starch mixture included 0.04% sodium hydroxide (based on the dry weight of the starch). The mixture was processed in accordance with the same processing conditions as are set out in the preceding example, and formed a product which was non-expanded, fully gelatinized, and had a light brown-yellow coloration.

EXAMPLE 6

The following is an example of the production of a Type C product. The extruder and processing were the same as for the two preceding examples. The mixture was the same as for example 2, but further included 0.04% sodium trimetaphosphate and 0.04% calcium carbonate (both on a dry weight of starch basis). The resulting product was similar in appearance to the Type A product described in example 5.

EXAMPLE 7

The following details the production of a Type B product using a single screw extruder having a barrel diameter of 25.4 mm and a 625 mm processing barrel, divided into three temperature control zones of equal length. The zones are heated to 50, 100 and 100 degrees C., respectively. The mixture comprised 23% moisture by total weight, and was extruded at a rate of 1.68 Kg/hr at a screw rotational speed of 50 rpm. The resulting product was similar in appearance to that of example 4.

EXAMPLE 8

The following example describes a method for making a Type B product utilizing a batch processing method. A slurry was prepared by dispersing 40% starch by weight in water, and then cooked until the starch was fully gelatinized. The resulting gel was poured to a depth of one half inch in a pan and dried for 2 hours in a forced air oven at 95 degrees C. After the first half hour of drying the gel was removed from the oven and broken into small pieces, and then returned to complete the drying cycle. The resulting product was similar in appearance to the product of example 4.

The occlusion of the moisture content within the glass-like starch materials described hereinabove results in these glass-like products being non-expandable using normal commercial methods associated with the production of, for example, the "half products" which are the subject of the abovementioned AU 74083/87 patent document. In general, glass-like starch products are physically distinguishable from expanded and puffed starch products by virtue of the glass-like products not having any significant number of substantial gas voids therein. In addition to not being expanded, glass-like starch-based materials in which the moisture is substantially occluded within the starch matrix strongly resist expansion. By way of example, a product according to the present invention does not expand substantially after exposure to 2450 MHz microwaves at a power of 720 watts for five minutes. This occlusion of moisture distinguishes such products from those glass-like starch-based materials previously known in the art, including those disclosed in U.S. Pat. No. 3,706,598 and AU 74083/87. According to the Australian publication, such products have three basic applications, namely as: snack foods, breakfast cereals, and instant products. These previously known products depend on the fact that the moisture content thereof, while residing in the glass-like starch matrix, is not substantially occluded and can be volatilized and released on exposure to, for example, microwaves, so as to produce a puffed (a.k.a. expanded) product. The U.S. patent relates to the production of glass-like starch hydrolysates having a dextrose equivalent of between 10 and 25, which are useful in dehydrated foods as bulking agents/humectants or as additives to soups or sauces, and which are readily dispersible in water. In order to meet the dispersability/solubility requirements, these products are at least partially hydrolysed and consequently are mechanically weakened, in such a way that the water residing in the matrix is not occluded. In both cases the desired properties are related to the production of glass-like starches in which the internal structure of the product is sufficiently under-developed or disrupted so as to allow water to be rapidly absorbed on the one hand, or rapidly released upon heating on the other hand.

Glass-like starches in which the moisture is substantially occluded are preferably based on starches having a dextrose equivalent of less than 10. These starches are preferably substantially unhydrolysed.

As already mentioned the present invention also provides a process for producing a solid glass-like starch-based material comprising the steps of heating a homogeneous, aqueous mixture of dispersed starch molecules, sufficiently to anneal the mixture into a glass-like solid upon cooling thereof, and without substantial volatilization of the moisture following formation of a matrix of starch molecules therein, whereby the moisture contained in the mixture is substantially occluded within the matrix of starch molecules.

The mixture can be heated to between 40 and 150 degrees C. Wherever temperatures in excess of the boiling point of water in the mixture are used, then the process should be carried out under pressure to preclude damage or destruction of the matrix at any time from its incipient formation, until the material is annealed in the form of a glass-like solid. In general extrusion processing allows higher product temperatures to be employed, through heating and mechanical working, and this expedites the production process. Moreover, the product which results from the extrusion process is generally more uniform than products produced using, for example, batch processing.

In accordance therefore with one aspect of the process of the present invention there is provided a process for extruding a solid glass-like polysaccharide comprising the steps of extruder heating and shearing a homogeneous, aqueous mixture of dispersed starch molecules, sufficiently to anneal the mixture into a substantially uncrystallized, glass-like solid upon cooling thereof, and without substantial volatilization of the moisture following formation of a matrix of starch molecules therein, whereby the moisture contained in the mixture is substantially occluded within the matrix of starch molecules. In this embodiment the mixture typically need only be heated to between 80 and 110 degrees C. The use of an extruder permits controlled heating through the use of independently controlled heating (and cooling) zones. In one embodiment for example, the heating is carried out in a plurality of heating zones, as in the case of one of the examples described elsewhere herein, and according to which the heating is carried out in three heating zones, heated to temperatures of 0 to 50, 50 to 150, and 50 to 150 degrees C., respectively. The rate of product throughput will influence the amount of heat transferee from or to these zones to or by the product and will depend on the size of the extruder in use.

Excessive mechanical working of the products of the present invention can adversely effect the ability of the polysaccharide matrix to hold the water in a substantially occluded condition. Accordingly, the specific mechanical energy input to the mixture during extruder heating and shearing is preferably between 0.05 and 0.2 Kw/kg.

The process of the invention can be further distinguished in that where, following heating and shearing the mixture exits through an opening in a die, it expands to not substantially more than twice the dimensions of the die opening. By way of example, the die opening described in Example 4 is circular and has a diameter of about 4 mm. In use in conjunction with the present invention, the diameter of the mixture (6–8 mm) after passing therethrough is not substantially greater than twice the diameter of the circular die opening.

Glass-like polysaccharides of the present invention are useful in abrasive grit applications. Particle size specifications for abrasive grit materials adapted to be entrained in a pneumatic stream are established in the industry. Accordingly, abrasive grit materials are ordered according to a specification such as 12/60 particle size. This specification means that the particles will pass through 12 U.S. mesh but will not pass through 60 U.S. mesh. A less expensive commercial utility grade specifies 20/40 particles sizes. The minimum particle size limits imposed by these specifications has to do with the fact that the grit becomes ineffective as an abrasive once the particles become smaller than 60 U.S. mesh. The following examples show the production of grit materials useful in the method of the present invention.

EXAMPLE 9

The extruded pellets prepared in the preceding examples from non-cross-linked glass-like starch-based materials were ground to form abrasive grit materials after having been allowed to cool and cure for a minimum of 24 hours. The cooled and cured pellets were then processed in a Raymond Laboratory Hammer Mill which was operated without a screen. The pellets were fed into the mill at about 20 pounds per hour. The material was passed through a 12 U.S. mesh screen and approximately 30% of the total mass passed through the screen upon first pass through the mill. The remaining 70% was then cycled through a second pass and about 35% of the original mass was still retained on the 12 U.S. mesh screen, which material was then passed through a third cycle. Following the third pass only about 1% of the original mass was still retained on the screen and the final particle size distribution was as follows:

| MESH | % BY WEIGHT RETAINED ON SCREEN |
| --- | --- |
| 12 | 1% |
| 20 | 63% |
| 30 | 18% |
| 40 | 10% |
| 60 | 6% |
| undersized | 2% |

EXAMPLE 10

Extruded pellets comparable to those used in Example 9 were ground to form abrasive grit materials after having been allowed to cool and cure for a minimum of 24 hours. The cooled and cured pellets were then processed in a Pallmann paddle mill. Both grinding plates were kept stationary and the gap between the plates and the paddles was adjusted to the maximum. The grinding rate was adjusted to about 200 pounds per hour and the operating temperature was about 43 degrees C. The product exiting the mill was sieved through a number 14 U.S. mesh screen and the overs were recycled through the mill until the final particle size distribution was as follows:

| MESH | % BY WEIGHT RETAINED ON SCREEN |
| --- | --- |
| 12 | 0% |
| 30 | 81.9% |
| 50 | 16.4% |
| undersized | 1.7% |

EXAMPLE 11

The extruded pellets prepared in Example 1 were ground to form abrasive grit materials after having been allowed to cool and cure for a minimum of 24 hours. The cooled and cured pellets were then processed in a Raymond Laboratory Hammer Mill which was operated without a screen. The pellets were fed into the mill at about 20 pounds per hour. Following the first pass only about 4% of the original mass was still retained on the screen and the overall particle size distribution was as follows:

| MESH | % BY WEIGHT RETAINED ON SCREEN |
| --- | --- |
| 12 | 1% |
| 20 | 51% |
| 30 | 21% |
| 40 | 13% |
| 60 | 10% |
| undersized | 4% |

A comparison of the results of grinding a cross-linked glass-like starch-based product as per example 11, and the results of examples 9 and 10, help to illustrate some of the effects of adding cross-linking agents.

The maximum size specification may be related to the fact that engineering plastic grits exhibit increased apparent hardness with increasing particle size, and while this also means the particle is more aggressive, it also increases the damage it causes to the substrate. The larger the particle size of glass-like starches of the present invention the more aggressive these particles become, but unlike engineering plastics, the increase in particle size of glass-like starch grits does not increase the apparent hardness of the particle and so does not result in any increase in damage to the substrate.

The apparent hardness of preferred glass-like starch grits is about 4.0 moh, or less, preferably between 2.5 and 3.5 moh and most preferably between 2.5 and 3.0 moh.

Particle integrity is measured by entraining 12/60 size particles in a pneumatic stream exiting a nozzle located at between 12 and 30 inches from an aluminum substrate surface, at a nozzle pressure of from about 9 to 35 psi, and is measured as a percentage of particles reduced by contact with the substrate under the above prescribed conditions, to a particle size smaller than 60 mesh. Particles especially useful in the present invention preferably have 10% and especially 6% breakdown or less per cycle. This compares very favorably with a 24% breakdown rate for a commercial engineering plastic sold under the trade mark Poly Extra, and is comparable to the breakdown rates associated with two other commercially available engineering plastics grit materials.

Admixtures of grits based on glass-like polysaccharides and other abrasive grit materials are within the contemplation of the present invention. In accordance with one aspect of the present invention, such a mixture comprises silica gel and glass-like starch based grits which when used in combination have the advantage of silica's ability to open the coating up for more rapid removal by the glass-like starch based grits, without materially increasing the amount of damage that is done to the substrate through the practice of the method of the present invention.

EXAMPLE 12

The following is an example of a Type I product, which is a blend of a Type B abrasive grit extruded and ground substantially in accordance with the preceding examples to meet a 14/30 U.S. mesh particle size specification. The grit was then mixed with a silica gel having a 12/20 U.S. mesh particle size specification, in a 9:1 weight ratio of starch grit to silica gel. Comparative testing of the Type B and Type I abrasive grits revealed that Type I grits exhibited four times greater aggressiveness in the practice of the method of the present invention, than that of the Type B product.

Before leaving the subject of grit materials useful in the present invention, note that even though the starch industry has traditionally used the term "starch grits" to describe a very particular starch product, that term has nothing whatsoever to do with the products being in any way useful as an abrasive grit, either in general or in the context of the present invention. Such "starch grits" are not glass-like polysaccharides, and lack the mechanical and physical properties thereof. For greater clarity, "starch grits" as that term is used in the starch industry, relates to an aggregated powdery material which upon hydration is similar to the original starch product, but which does not pose the dust hazards associated with regular starch when dry. U.S. Pat. No. 2,929,748 relates to the production of such "starch grits". These products are essentially agglomerates of generally ungelatinized starch granules that are held together by a much smaller amount of substantially gelatinized starch which acts as an interstitial glue. The glass-like starches useful in the present invention on the other hand are substantially completely gelatinized. While some such glass like starches are readily soluble in water, they do not form, and are not able to form, hydrated aqueous dispersions of starch granules such as those which by definition are formed when "starch grits" are hydrated.

The foregoing are examples of glass-like polysaccharide grit materials useful in the practice of the method of the present invention. What follows is a series of examples of that method in use. In general, particulates useful in the present method can be employed using known devices, such as jet wheel blasters, which mechanically accelerate the particulates, and direct them against a surface to be treated. Jet blasters utilize a wheel whose circumference is operated a supersonic speeds. Other similar devices include centrifugal blasters which operate on a similar principle, but at a generally lower speeds. In cases where the particulate is to be used as an abrasive, the grit may be secured to a substrate and the two are used together in much the same way as conventional sandpaper or abrasive paper or cloths.

Preferably, however, the polysaccharide grits are entrained in a pneumatic stream and are directed at an angle of from about 45 to 90 degrees to the substrate surface. Typically the angle will be about 70 to 90 degrees and preferably about 75 degrees. The pneumatic stream preferably exits from a nozzle positioned between 24 and 30 inches from the substrate, at a nozzle pressure of from about 40 to about 65 psi, and at a rate of about one to 2.5 pounds of grit over a substrate surface area of about 0.03 to 3 square feet per minute.

EXAMPLE 13

This example relates to the removal of paint from an aluminum clad surface using a Pauli & Griffin PRAM 31 Direct Pressure Plastic Media Blast Cabinet.

The pressure pot of a pressure blast cabinet was filled with 12/20 specification Type B glass-like starch-based abrasive grit product. Using a ¾ inch diameter hose and a ⅜ inch diameter nozzle the grit flow rate was adjusted to one pound per minute of grit at 20 psi nozzle pressure. The nozzle was kept at a distance of 30 inches from, and at an angle of about 70 degrees to the test panel. The test panel was a 2024t3 aluminum panel meeting specification QQ-A-250-05F-T3 and having an aluminum cladding thickness of 0.050 inches. This aluminum panel was painted with an epoxy primer and a polyurethane top coat manufacture by De Soto. The paint had been cured for ten days at room temperature and for 3 days at 45 degrees C.

The blasting proceeded at a rate of about 2 to 3 square feet per minute and removed the top coat, but additional blasting was required to remove the primer coat. With the primer coat removed the test panel had lost its original mirror finish but prolonged exposure of the bare metal showed no visual damage resulting from the blasting. The breakdown rate of the grit was about 6% per cycle.

EXAMPLE 14

The grit container of a suction blast cabinet designed especially for use with engineering plastic grit, was filled with 12/20 specification Type B glass-like starch-based abrasive grit product. Using a 1 inch diameter hose and a ½ inch diameter nozzle the orifice for the grit feeding rate was adjusted to obtain a continuous non-pulsing flow at 60 psi nozzle pressure. The distance between the nozzle and the substrate was maintained at between 4 and 6 inches at an angle of between 70 and 90 degrees. The test sample was substantially the same as that described above in relation to example 13. The results of the blasting were the same as reported above in respect of example 13.

EXAMPLE 15

The grit container of a spot blaster was filled with 12/20 specification Type B glass-like starch-based abrasive grit product. Using a ¼ inch diameter hose and a ¼ inch diameter nozzle the orifice for the blasting pressure at the inlet was adjusted to 65 psi. The distance between the nozzle and the substrate was kept at 3 inches and at an angle of 90 degrees. The test sample was prepared in the same way as for the preceding example.

When blasting was carried out at a rate of about 5 square inches of substrate surface per minute, both the top coat and the primer were removed from the test panel. The cleaned metal surface was substantially the same as described in the two preceding examples, even after prolonged exposure of the bare metal to the continued action of the spot blaster.

EXAMPLE 16

The following example illustrates the removal of corrosion-resistant paint from an aluminum clad substrate.

The same cabinet that was used in Example 13, was prepared by again filling the pressure pot with 12/20 specification Type B glass-like starch-based abrasive grit product. The grit flow rate was adjusted to 2.5 pounds per minute at a nozzle pressure of 40 psi. The nozzle was maintained at a distance of about 24 inches from, and at an angle of about 70 degrees to the test panel surface.

The test panel was a 2024t3 aluminum panel meeting specification QQ-A-250-05F-T3 and having an aluminum cladding thickness of 0.050 inches. This aluminum panel was painted with an epoxy primer and an epoxy top coat manufacture by U.S. Paints. The panel was then cured following the same regimen described in example 13.

Blasting was carried out at a rate of 2 to 3 square feet per minute and the top coat was removed, while the green coloration of the primer remained on the test panels surface. Continued blasting removed the residual primer as well and although the original mirror surface of the aluminum substrate had been lost, continued blasting had no adverse visual effect on the metal surface.

EXAMPLE 17

The following is an example of the present method as applied to the removal of paint from a fiberglass substrate.

The cabinet as described in example 13 was prepared as before, using 12/20 specification Type B glass-like starch-based abrasive grit product and adjusting the flow rate of the grit to about one pound per minute at a nozzle pressure of about 20 psi. The nozzle was maintained at a distance of about 18 inches from and an angle of about 45 degrees to the test panel.

The test panel was a fiberglass substrate painted and cured in the manner described in example 15.

When blasting was carried out at a rate of about ½ square foot per minute, the paint was completely removed from the fiberglass substrate, although the substrate was not abraded by the blast. Continued exposure of the substrate to the blast, however, did erode the fiberglass surface and expose the fibers embedded therein.

EXAMPLE 18

The following example demonstrates the effect of two different grit size specifications in the practice of the method of the present invention.

The same cabinet as mentioned in example 13 was prepared in two separate test runs to compare the performance of a 12/20 specification glass-like starch-based abrasive grit product with a 12/60 specification glass-like starch-based abrasive grit product.

The particle size distributions of the two products are set out in the following table:

| % BY WEIGHT RETAINED ON SCREEN | | |
| --- | --- | --- |
| 12/20 spec. | 12/60 spec. | MESH |
| 1% | 1% | 12 |
| 98% | 62% | 20 |
| 1% | 19% | 30 |
| 0% | 12% | 40 |
| 0% | 4% | 60 |
| 0% | 2% | undersized |

The average (or effective) particle size of the 12/60 specification product is lower than that of the 12/20 specification product. When the respective blast trials were carried out the rate of paint removal that could be achieved using the 12/60 specification product was only half that of the 12/20 specification product when the two were compared under identical operation conditions.

The embodiments of the invention in which an exclusive property or privilege is claimed are defined as follows:

1. A process for producing chemically cross-liked, polysaccharide grit particles, comprising the steps of:
   a) heating a homogeneous, aqueous mixture of dispersed polysaccharide molecules produced from starch and a chemical cross-linking agent to anneal the mixture whereby at normal ambient temperatures the mixture forms a solid product having a moisture content of about 10–70% by weight;
   b) reacting the chemical cross-linking agent with said polysaccharide molecules to produce intermolecular chemical cross-linkages between the polysaccharide molecules; and
   c) grinding the solid product obtained thereby to form grit particles having an apparent hardness of up to about 4.0 moh.

2. The process according to claim 1 wherein step b) is carried out only after the mixture has formed into the solid product.

3. The process according to claim 2 wherein the grit particles are treated with a source of hydroxyl ions to react the cross-linking agent with at least some of the polysaccharide molecules.

4. The process according to claim 1 wherein the mixture includes up to about 0.2% of said cross-linking agent by dry weight of polysaccharide molecules.

5. The process according to claim 4 wherein the mixture includes between 0.01 and 0.2% of said cross-linking agent by dry weight of polysaccharide molecules.

6. The process according to claim 5 wherein the mixture contains between 0.03 and 0.6% of said cross-linking agent by dry weight of polysaccharide molecules.

7. The process according to claim 6 wherein the cross-linking agent is selected from the group consisting of epichlorhydrin, sodium tripolyphosphate and sodium trimetaphosphate.

8. The process according to claim 1 wherein the grit particles comprise a starch having a dextrose equivalent of less than 10.

9. The process according to claim 8 wherein the starch is substantially unhydrolysed.

10. The process according to claim 9 wherein moisture is occluded within interstices of a matrix of starch molecules.

11. The process according to claim 10 wherein the grit particles are uncrystallized and the matrix is amorphous.

12. The process according to claim 11 wherein the starch is wheat starch.

13. The process according to claim 12 wherein the grit particle sizes range from about 12 to about 60 U.S. mesh.

14. The process according to claim 13 wherein the grit particle sizes range from about 12 to about 40 U.S. mesh.

15. The process according to claim 14 wherein the grit particle sizes range from about 12 to about 20 U.S. mesh.

16. The process according to claim 13 wherein the apparent hardness of the grit particles is from about 2.5 to about 3.5 moh.

17. The process according to claim 16 wherein the apparent hardness of the grit particles is from about 2.5 to about 3.0 moh.

18. The process according to claim 12 wherein the moisture content of the grip particles is between about 10% to about 40% by weight.

19. The process according to claim 18 wherein the moisture content of the grip particles is in the range of from about 20 to about 25% by weight.

20. A process for the production of polysaccharide grit particles having an occluded moisture content comprising the steps of a) heating a homogeneous, aqueous mixture of dispersed polysaccharide molecules sufficiently to anneal the mixture into an uncrystallized, solid upon cooling thereof without volatilization of the moisture contained in the mixture, whereby the moisture contained in the mixture is occluded within the matrix of polysaccharide molecules, and b) grinding the solid to form grit particles having an apparent hardness of up to about 4.0 moh.

21. The process according to claim 20 wherein said grit particles comprise starch having a dextrose equivalent of less than about 10.

22. The process according to claim 21 wherein said starch is substantially unhydrolysed.

23. The process according to claim 20 wherein said matrix of polysaccharide molecules is amorphous.

24. The process according to claim 21 wherein said starch is wheat starch.

25. The process according to claim 24 wherein said grit particle sizes range from about 12 to about 60 U.S. mesh.

26. The process according to claim 25 wherein said grit particle sizes range from about 12 to about 40 U.S. mesh.

27. The process according to claim 26 wherein said grit particle sizes range from about 12 to about 20 U.S. mesh.

28. The process according to claim 25 wherein the apparent hardness of said grit is from about 2.5 to about 3.5 moh.

29. The process according to claim 28 wherein the apparent hardness of said grit is from about 2.5 to about 3.0 moh.

30. The process according to claim 24 wherein the moisture content of the grit particles is from about 10 to about 70% by weight.

31. The process according to claim 30 wherein the moisture content of the grit particles is from about 10 to about 40% by weight.

32. The process according to claim 31 wherein the moisture content of the grit particles is from about 20 to about 25% by weight.

33. The process according to claim 32 wherein the moisture content of the grit particles is about 20% by weight.

* * * * *